(12) United States Patent
De Waal et al.

(10) Patent No.: US 12,094,308 B2
(45) Date of Patent: Sep. 17, 2024

(54) CAMERA MOUNTING ARRANGEMENT

(71) Applicant: Allbro (Pty) Ltd, Boksburg (ZA)

(72) Inventors: Arend De Waal, Bloemfontein (ZA); Quintin Lamprecht, Boksburg (ZA)

(73) Assignee: Allbro (Pty) Ltd, Boksburg (ZA)

( * ) Notice: Subject to any disclaimer, the term of this patent is extended or adjusted under 35 U.S.C. 154(b) by 26 days.

(21) Appl. No.: 17/593,195

(22) PCT Filed: Mar. 11, 2020

(86) PCT No.: PCT/IB2020/052102
§ 371 (c)(1),
(2) Date: Sep. 10, 2021

(87) PCT Pub. No.: WO2020/183377
PCT Pub. Date: Sep. 17, 2020

(65) Prior Publication Data
US 2022/0189268 A1    Jun. 16, 2022

(30) Foreign Application Priority Data

Mar. 11, 2019   (ZA) .................................. 2019/01483

(51) Int. Cl.
G08B 13/196    (2006.01)
G03B 17/56     (2021.01)

(52) U.S. Cl.
CPC . *G08B 13/19619* (2013.01); *G08B 13/19632* (2013.01); *G03B 17/561* (2013.01)

(58) Field of Classification Search
USPC ........................................................ 348/143
See application file for complete search history.

(56) References Cited

U.S. PATENT DOCUMENTS

| | | | | |
|---|---|---|---|---|
| 8,148,634 B1 * | 4/2012 | Gretz | ..................... | H02G 3/123 |
| | | | | 174/53 |
| 2009/0290023 A1 * | 11/2009 | Lefort | ................ | G08B 13/1963 |
| | | | | 348/151 |

FOREIGN PATENT DOCUMENTS

| | | |
|---|---|---|
| EP | 1593903 A2 | 11/2005 |
| EP | 2801744 A1 | 11/2014 |

OTHER PUBLICATIONS

International Search Report issued for International Patent Application No. PCT/IB2020/052102, dated Aug. 10, 2020 in 4 pages.

* cited by examiner

*Primary Examiner* — Mikhail Itskovich
(74) *Attorney, Agent, or Firm* — Knobbe, Martens, Olson & Bear, LLP

(57) ABSTRACT

The invention concerns a camera mounting arrangement for mounting a camera. The mounting arrangement includes an enclosure for housing electrical connections between the camera and a surveillance system, a cover which is removably connectable to the enclosure to close off the enclosure when connected to the enclosure and a camera support for supporting the camera. The enclosure and camera support are off-set from one another such that the cover may be removed to allow access to the enclosure while the camera is supported by the camera support. The invention also concerns a method for mounting a camera.

25 Claims, 17 Drawing Sheets

CAMERA MOUNTING ARRANGEMENT

CROSS-REFERENCE TO RELATED APPLICATIONS

This application is the U.S. National Phase under 35. U.S.C. § 371 of International Application PCT/IB2020/052102, filed Mar. 11, 2020, which claims priority to South Africa Patent Application No. 2019/01483, filed Mar. 11, 2019. The disclosures of the above-described applications are hereby incorporated by reference in their entirety.

BACKGROUND TO THE INVENTION

This invention relates to a camera mounting arrangement and more particularly, but not exclusively, to a camera mount for a surveillance camera.

Surveillance systems are well-known and many variations are used depending on the different applications. One common form of surveillance is video surveillance, which makes use of video cameras for monitoring purposes, for example. Video surveillance systems are used in many places, such as businesses, shopping malls, hospitals, universities and residential properties, and typically monitor assets as part of security systems. The cameras are required to be mounted to support surfaces and most commonly at height to provide the desired field of view as well as to be out of reach to prevent tampering. In a typical closed-circuit television (CCTV) system, the cameras transmit a video feed that is not publicly broadcast but to a specific location for monitoring and/or storage. In many installations the cameras are wired to a power supply and/or to connect the cameras to the surveillance system for the transmission of the video feed. Mounting the cameras at height poses a significant problem, which is often exacerbated by the need to connect and test wires during the installation process.

At present the two most commonly used camera mounting methods are referred to as direct to surface mounting and standard enclosure mounting. In direct to surface mounting the cameras are mounted directly to a support surface, such as a wall, ceiling or pole. A problem with this method is that no protection is offered to the camera wire connections against water, dust, tampering etcetera. In standard enclosure mounting the cameras are mounted to standard electrical enclosures such as outdoor electrical boxes. Typically, the base of the enclosure is mounted to the support surface while the camera is mounted to the lid of the enclosure. Considering that the enclosure was not designed for the mounting of a camera it is necessary to make several modifications thereto in order to allow for the mounting of the camera. The lid is typically modified by making holes in it to allow the camera to be fastened thereto and to allow its wires to pass through the lid. The wires running from the camera are then connected to the wires running from the power supply and/or surveillance system, which typically terminate in the body or base of the enclosure. Only after connecting the wires to one another can the lid be fastened to the base of the enclosure. Standard enclosure mounting poses several problems, which are exacerbated due to the cameras often being mounted at height.

One problem experienced with the abovementioned mounting methods is the inability to mount the camera and access its wire connections simultaneously. Typically during an installation access to the wire connections are needed for connecting the camera to a power supply, connecting the camera to the surveillance system, testing the camera, replacing the camera and/or connecting new wires to the camera. With the camera mounted to the lid of a standard enclosure, the lid has to be mounted to the base of the enclosure in order to hold the camera in position. When the lid carrying the camera is mounted to the base of the enclosure, which is in turn mounted to the support surface, the standard enclosure is closed and access to the wire connections are prevented.

A person skilled in the art of camera installations will know that preventing access to the wire connections results in an inability to test the camera locally. During installation an installer typically tests the camera using a camera-tester, which powers the camera and allows the installer to review the camera's field of view, thereby allowing for adjustments while being installed. Using standard enclosure mounting this is not possible and the camera's field of vision can only be tested by connecting it to the surveillance system and then viewing the footage at the remote location to where the video feed is transmitted. The inability to view the video feed locally at the installation point requires an installer to adjust the camera position based on remote feedback received from the remote location. This often becomes a tedious process for installers as they may have to ascend to and descend from the installation position a number of times. The reliance on remote feedback also makes it difficult for a single person to attend to an installation. As a result, an installer typically has to rely on another person who is monitoring the surveillance system for instructions when adjusting the camera. From the above it can be seen that the current installation method is generally inefficient and time consuming.

Another problem with standard enclosure mounting is that, during installation, the installer has to hold onto the camera and lid assembly, connect the wires and subsequently connect the camera and lid assembly to the base of the enclosure. Due to the typical mounting positions of cameras, these steps are usually carried out at height, which is difficult and require a great deal of dexterity from the installer. This installation process poses a danger to the installer working at height, as well as a risk to the camera which could fall during installation, especially while connecting the wires.

Another problem with standard enclosure mounting is that the enclosure does not cater for the mounting of cameras. As mentioned above, the installer has to modify the enclosure to make mounting holes and, accordingly, there is no provision for the mounting of different cameras that have different mounting configurations. The modification of the standard enclosure to mount the camera to the lid and to create a clearance hole for the camera wires also compromises the ingress protection rating of the enclosure. As a result, the enclosures often do not provide adequate protection for the wire connections. This problem is often exacerbated in installations comprising multiple cameras in a location, which may require running multiple lengths of conduit in parallel to each standard enclosure or, alternatively, running multiple lengths of conduit between enclosures that are connected in series. In these installations it is required to modify the standard enclosures to allow for the conduits to enter the enclosures.

In view of the above it is clear that the existing method of mounting surveillance cameras are far from ideal. Apart from the problems relating to the practicality around the installation of the cameras there is also significant risk involved considering that an installer is working at height. There is accordingly a need to simplify the installation process in order to limit the number of tasks required by an installer working at height and thereby to mitigate the risk of injury to the installer or damage to equipment. At the same time there is a need for an installation that allows for adequate ingress protection for wire connections.

It is accordingly an object of the invention to provide a camera mounting arrangement and associated mounting method that will, at least partially, address the above disadvantages.

It is also an object of the invention to provide a camera mounting arrangement and a method of mounting a camera using such mount which will be useful alternatives to existing camera mounts and methods of mounting cameras.

SUMMARY OF THE INVENTION

According to one aspect of the invention there is provided a camera mounting arrangement for mounting a camera including:
- an enclosure for housing electrical connections between the camera and a surveillance system;
- a cover which is removably connectable to the enclosure to close off the enclosure when connected to the enclosure;
- a camera support for supporting the camera;
- wherein the enclosure and camera support are off-set from one another such that the cover may be removed to allow access to the enclosure while the camera is supported by the camera support.

In one embodiment of the invention the camera and camera mounting arrangement are integrally formed such that the camera is irremovable, i.e. not removable, from the camera mounting arrangement. The camera preferably carries the camera mounting arrangement.

In another embodiment of the invention the camera support is in the form of a mounting platform comprising means for mounting a camera thereto such that the camera is removably connectable to the camera mounting arrangement.

The enclosure and camera support are preferably integrally formed, preferably moulded.

The camera support may extend or protrude from the enclosure.

The means for mounting a camera to the mounting platform may include a number of formations which allow for different mounting configurations. The formations may be in the form of openings, typically slots, through which fasteners may in use extend to secure the camera to the mounting platform.

The mounting platform may further carry a recess through which the camera wires run when, in use, the camera is mounted to the camera mounting arrangement.

The mounting platform may include a side wall defining a skirt. The skirt is preferably a protective skirt that provides ingress protection to the camera wires. The skirt preferably runs around substantially the entire periphery of the mounting platform and is shaped to engage the support surface against which the camera is in use mounted.

The camera mounting arrangement preferably has a channel extending between the mounting platform and the enclosure along which the camera wires in use run, wherein the channel provides protection for the wires.

The enclosure may have a base and side walls extending from the base, wherein the base may define a passage through which wires in use run. The passage is open to, and preferably integrally formed with, the channel in which the camera wires run.

The camera mounting arrangement may include a closure which is receivable in the passage in the enclosure thereby to provide ingress protection to the wire connections located in the enclosure. The closure may be in the form of a grommet, preferably made from a resilient material such as rubber. The camera mount may further include a grommet cover for protecting the grommet.

The side walls of the enclosure may carry openings for receiving conduits. Alternatively, the enclosure may carry a number of areas of weakness that define knock-out holes to create the openings for receiving conduits. In yet another embodiment the walls may solid without any openings.

The camera mounting arrangement may further include a mounting bracket for connecting the enclosure to the support surface. The mounting bracket preferably carries an engagement formation for engaging the enclosure, particularly a complementary shaped engagement formation located on the enclosure.

The engagement formation on the mounting bracket may be in the form of an upstanding hook so as to define a space between it and the support surface against which the camera is, in use, mounted, wherein the engagement formation located on the enclosure is received in the space between the hook formation and support surface. In the preferred embodiment the hook formation is shaped such that it is open to the top, i.e. faces upwards, thereby to receive the engagement formation located on the enclosure from the top.

The mounting bracket and enclosure may define aligned securing formations in which a fastener may be received for securing the enclosure to the mounting bracket.

The cover and enclosure may define aligned securing formations in which a fastener may be received for securing the cover to the enclosure.

A sealing arrangement may be located between the cover and the enclosure for ingress protection. In the preferred embodiment, a seal runs substantially around the periphery of the cover.

In accordance with a second aspect of the invention there is provided a method of installing a camera, preferably using a camera mounting arrangement according to the first aspect of the invention, the method includes the following steps:
- securing the mounting bracket to a support surface;
- engaging the body of the camera mounting arrangement to a complementary shaped engaging formation of the mounting bracket such that the body is suspended from the mounting bracket;
- mounting the camera to the mounting platform;
- securing the body of the camera mounting arrangement and camera mounted on the mounting platform to the mounting bracket.
- connecting the camera wires to the wires from the surveillance system;
- locating the wire connections in the enclosure; and
- closing off the enclosure by connecting the cover to the enclosure, thereby providing ingress protection for the wire connections.

The step of mounting the camera to the camera platform may include drawing the camera wires through a grommet located in a base of the enclosure and into the internal volume of the enclosure.

After drawing the camera wires into the enclosure, a grommet cover may be secured to the enclosure. This step may include clipping the grommet cover on to the mounting platform.

The step of mounting the camera to the camera support may be done separately and independently from securing the mounting bracket to the support surface.

The method preferably allows for the installation and positioning of the camera and its associated field of view and the installation of a surveillance system and its associated cabling to be carried out separately and independent of each other.

The method may include allowing for localised access to the camera connections while the camera is mounted to the support surface such that the camera's field of view may be adjusted locally during installation based on feedback from a camera tester prior to the camera being connected to the surveillance system.

According to another aspect of the invention there is provided a camera mounting arrangement including:
 an enclosure;
 a cover which is removably connectable to the enclosure to close off the enclosure;
 a mounting platform comprising means for mounting a camera thereto;
 wherein the mounting platform and enclosure are off-set from one another such that the cover may be removed to allow access to the enclosure while the camera is mounted on the mounting platform.

In accordance with yet another aspect of the invention there is provided a camera including a camera mounting arrangement according to the first aspect of the invention.

BRIEF DESCRIPTION OF THE DRAWINGS

The invention will now be described in more detail, by way of example only, with reference to the accompanying drawings in which.

DESCRIPTION OF THE ILLUSTRATED EMBODIMENTS

Figure 1:
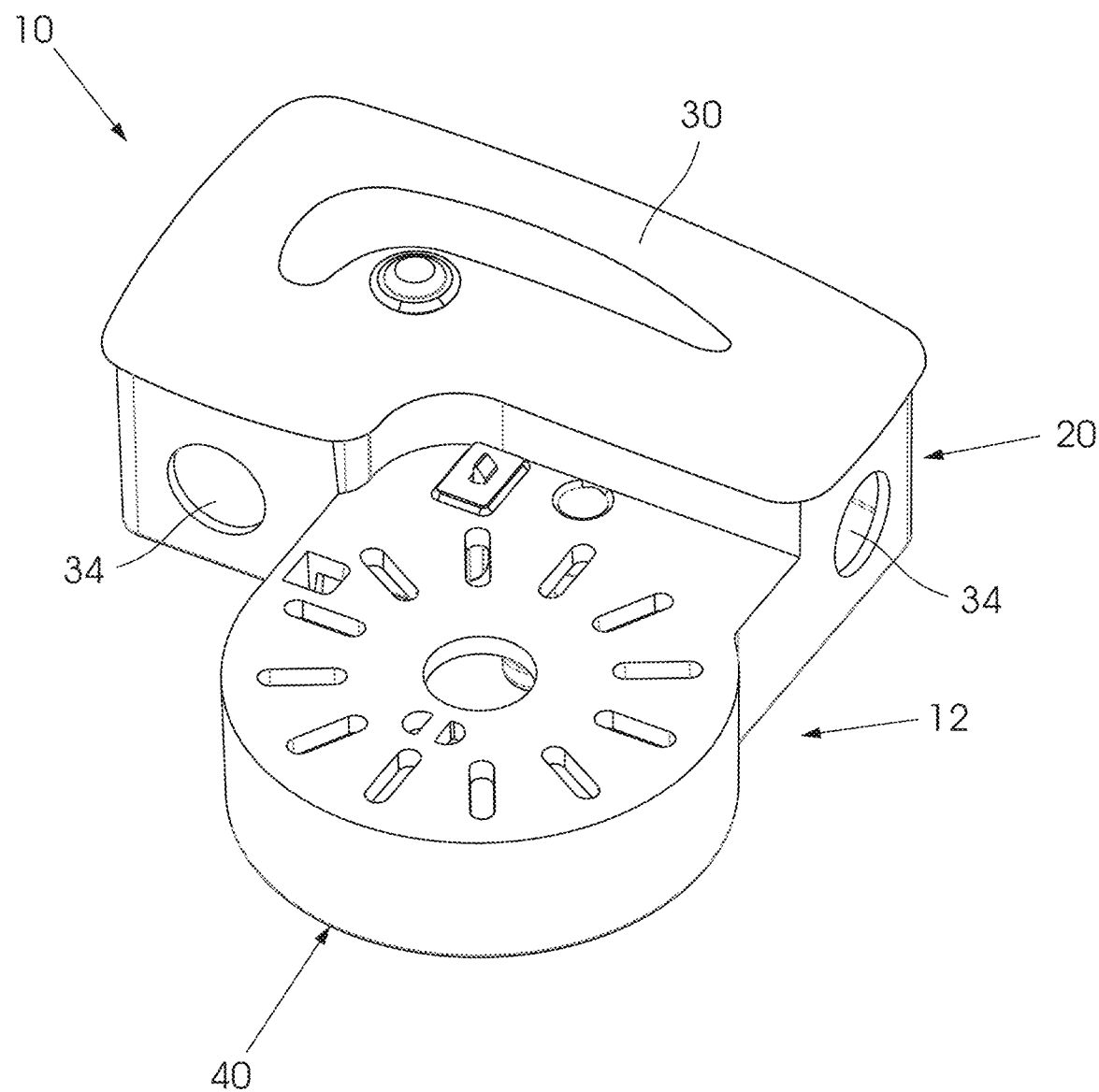
FIG. 1 shows a first top perspective view of a camera mounting arrangement in the form of a camera mount in accordance with the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings and are thus intended to include direct connections between two members without any other members interposed therebetween and indirect connections between members in which one or more other members are interposed therebetween. Further, "connected" and "coupled" are not restricted to physical or mechanical connections or couplings. Additionally, the words "lower", "upper", "upward", "down" and "downward" designate directions in the drawings to which reference is made. The terminology includes the words specifically mentioned above, derivatives thereof, and words or similar import. It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Referring to the drawings, in which like numerals indicate like features, a non-limiting example of a camera mounting arrangement in accordance with the invention is generally indicated by reference numeral 10. In this illustrated embodiment of the camera mounting arrangement 10 of the invention the camera mounting arrangement is intended for mounting a camera that is removably connectable to the camera mounting arrangement. The camera mounting arrangement 10 is therefore also referred to as a camera mount. The camera and camera mount 10 are separate from one another. However, it is envisaged that in another embodiment not illustrated in the drawings the camera and camera mounting arrangement could be integrally formed such that the camera is irremovable, i.e. not removable, from the camera mounting arrangement. In this alternative embodiment the camera mounting arrangement is integrally formed with the camera. It should be understood that in this alternative embodiment the camera carries the camera mounting arrangement. For example, the camera mounting arrangement could be formed as part of a camera housing.

Figure 2:
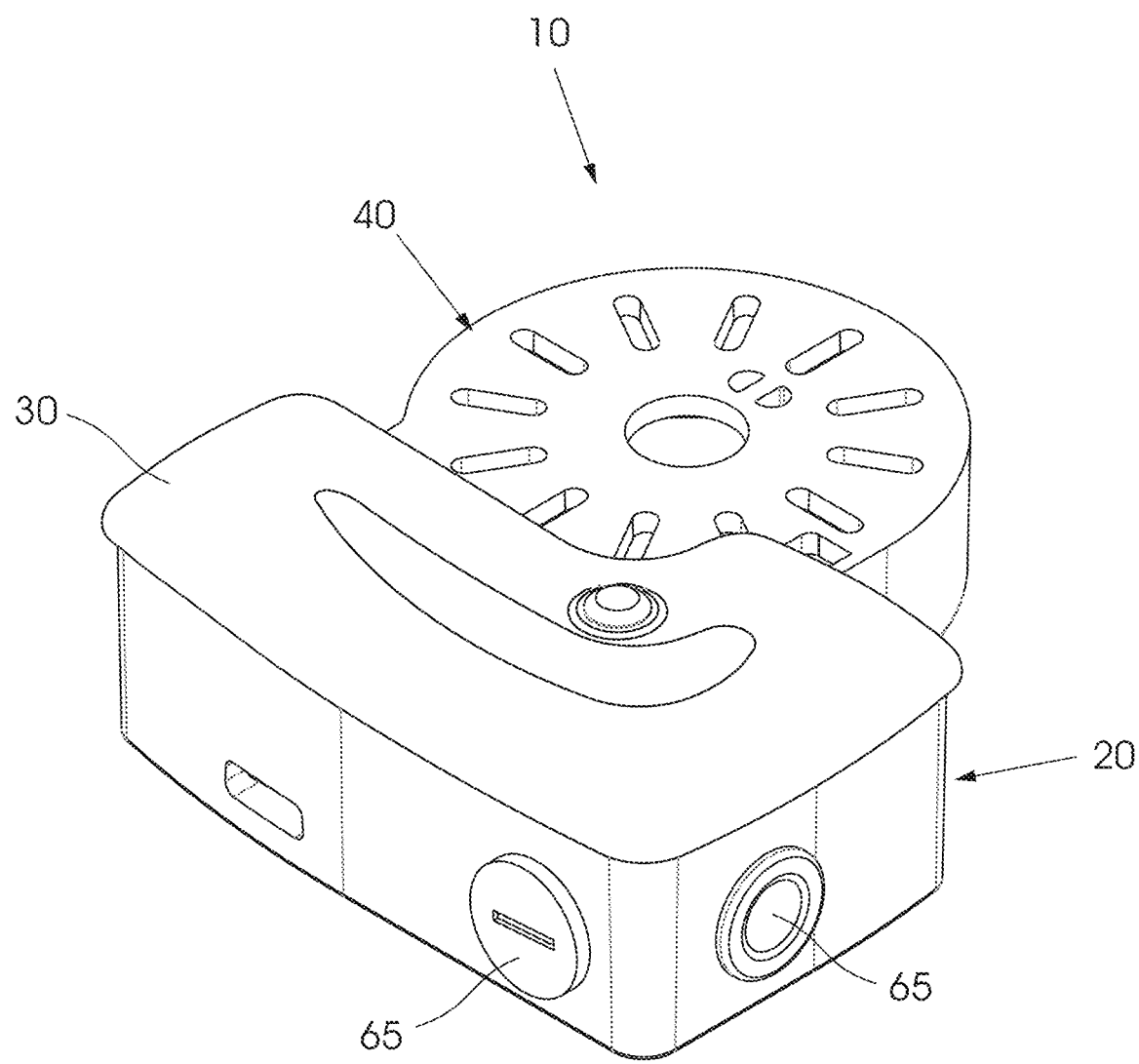
FIG. 2 shows a second top perspective view of the camera mount of FIG. 1.
Figure 3:
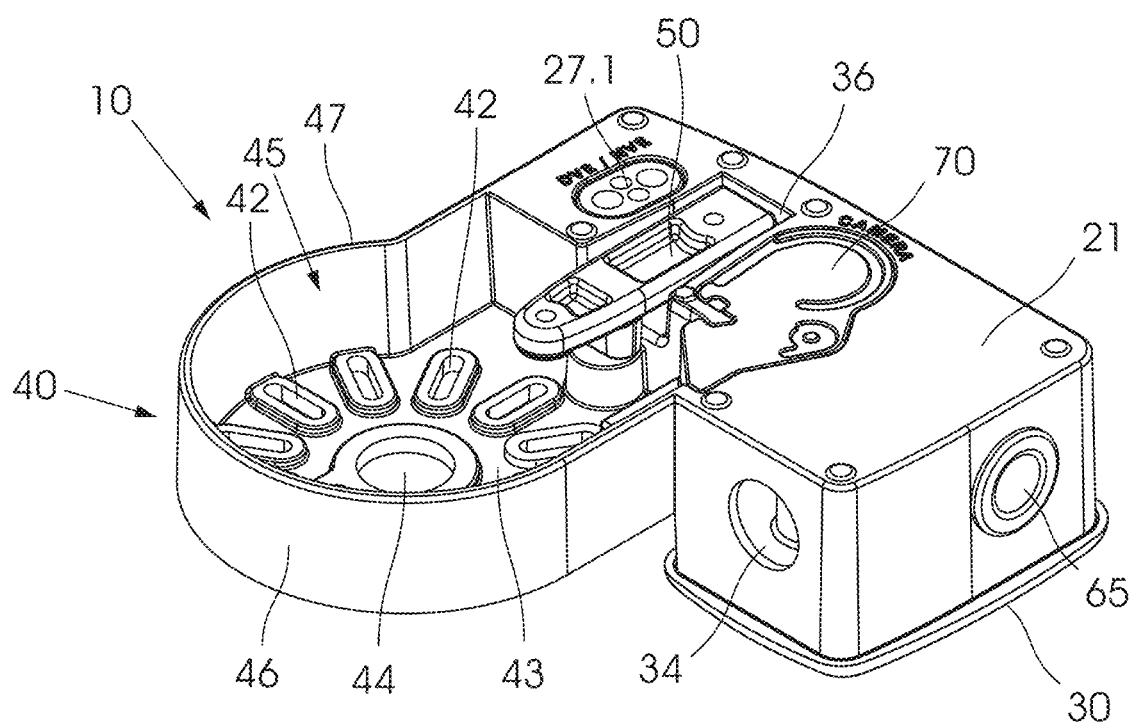
FIG. 3 shows a bottom perspective view of the camera mount of FIG. 1.
Figure 4:
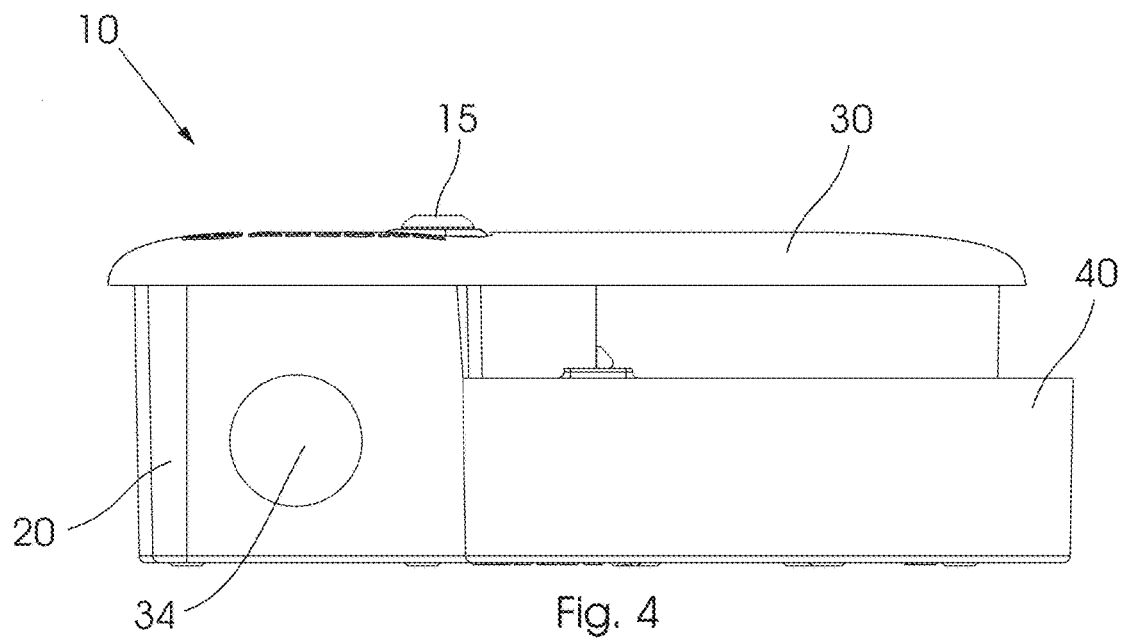
FIG. 4 shows a front view of the camera mount of FIG. 1.
Figure 5:
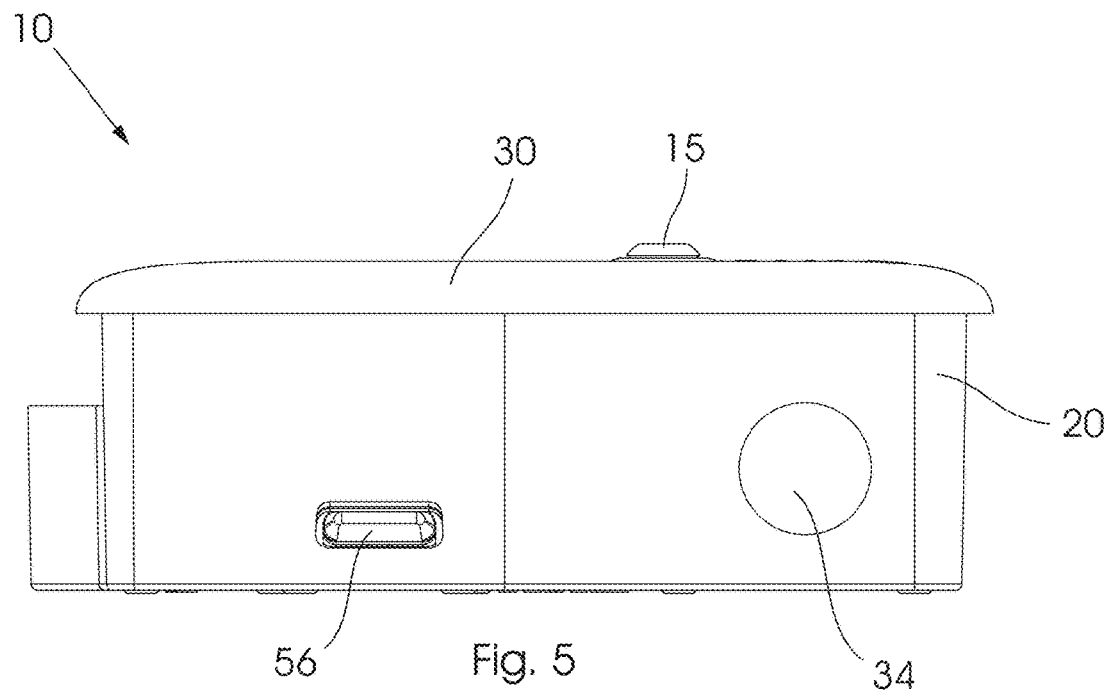
FIG. 5 shows a rear view of the camera mount of FIG. 1.
Figure 6:
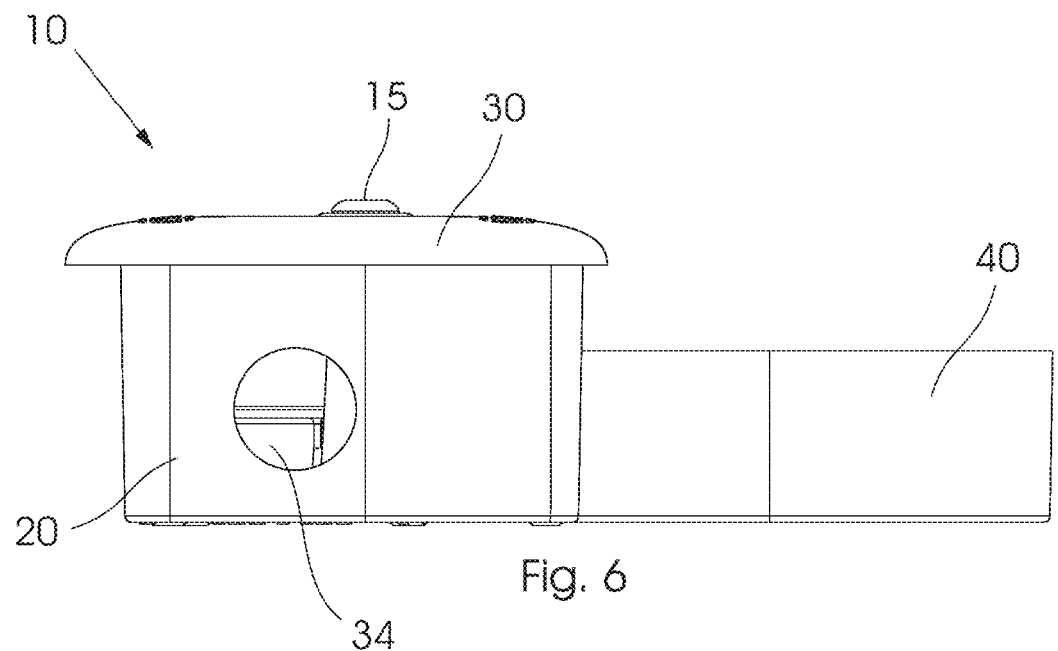
FIG. 6 shows a left side view of the camera mount of FIG. 1.
Figure 7:
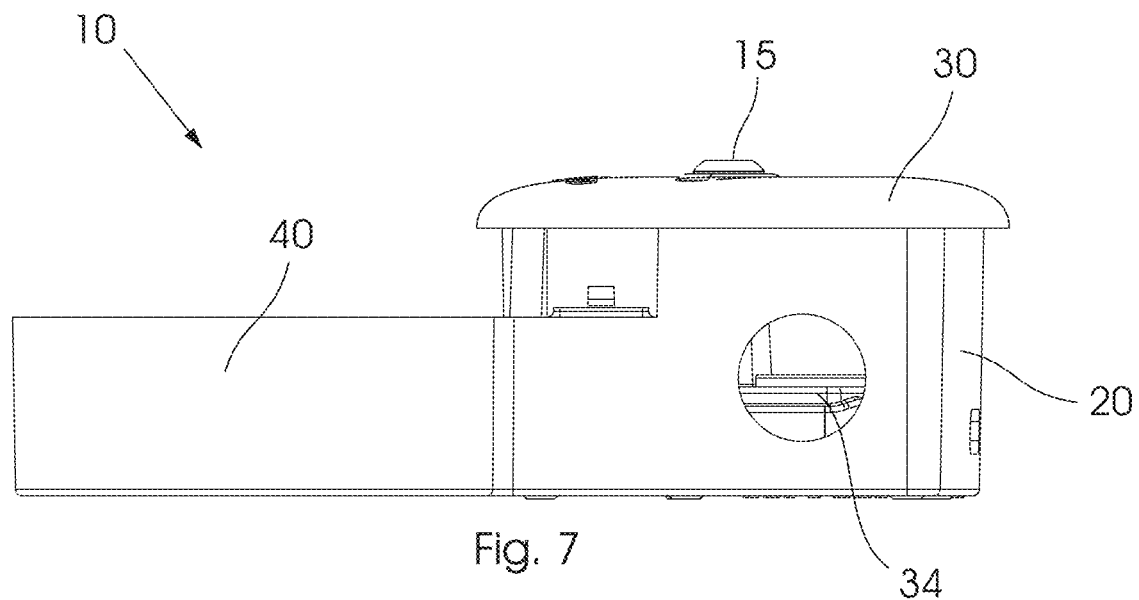
FIG. 7 shows a right side view of the camera mount of FIG. 1.
Figure 8:
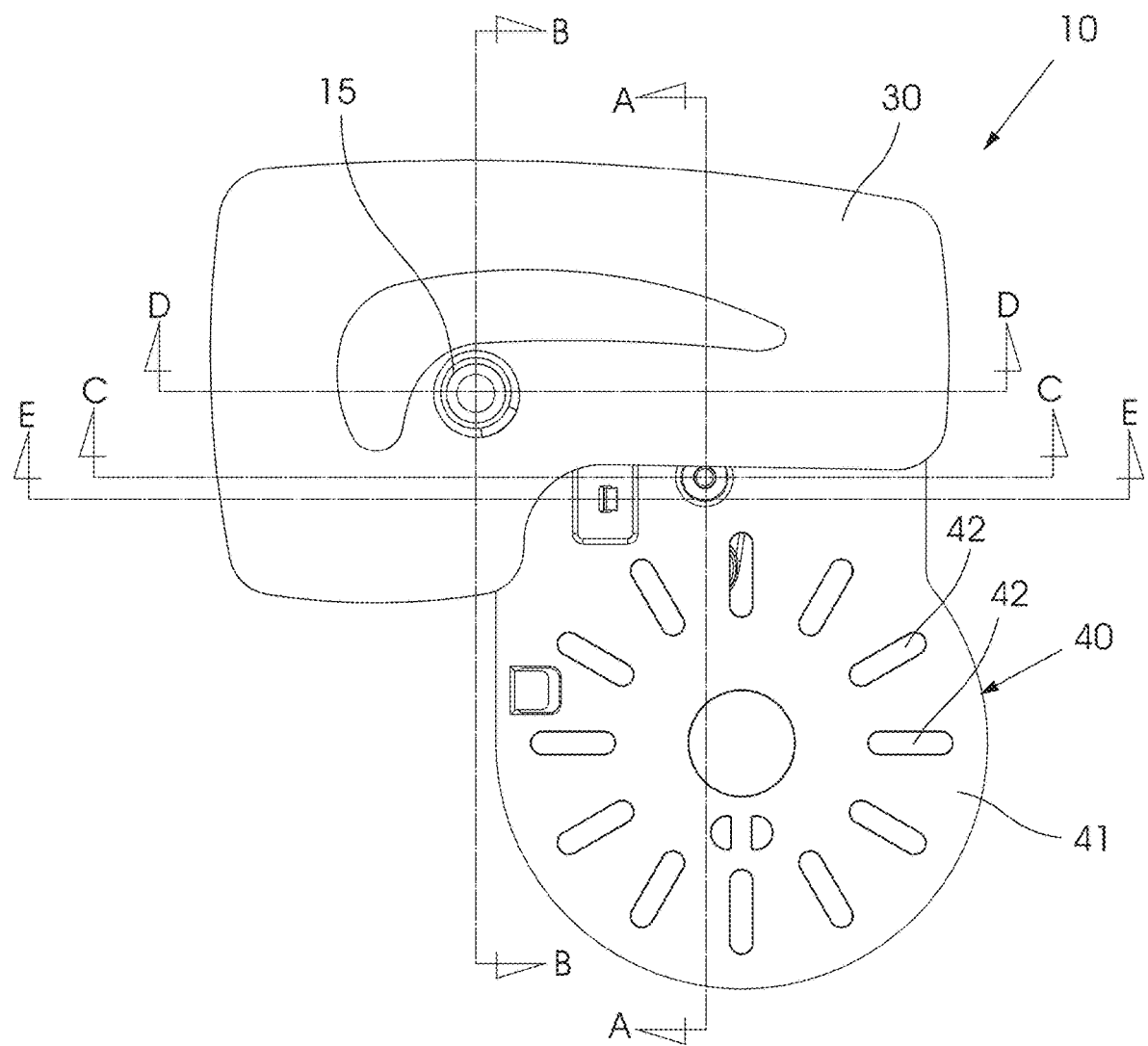
FIG. 8 shows a top view of the camera mount of FIG. 1.
Figure 9:
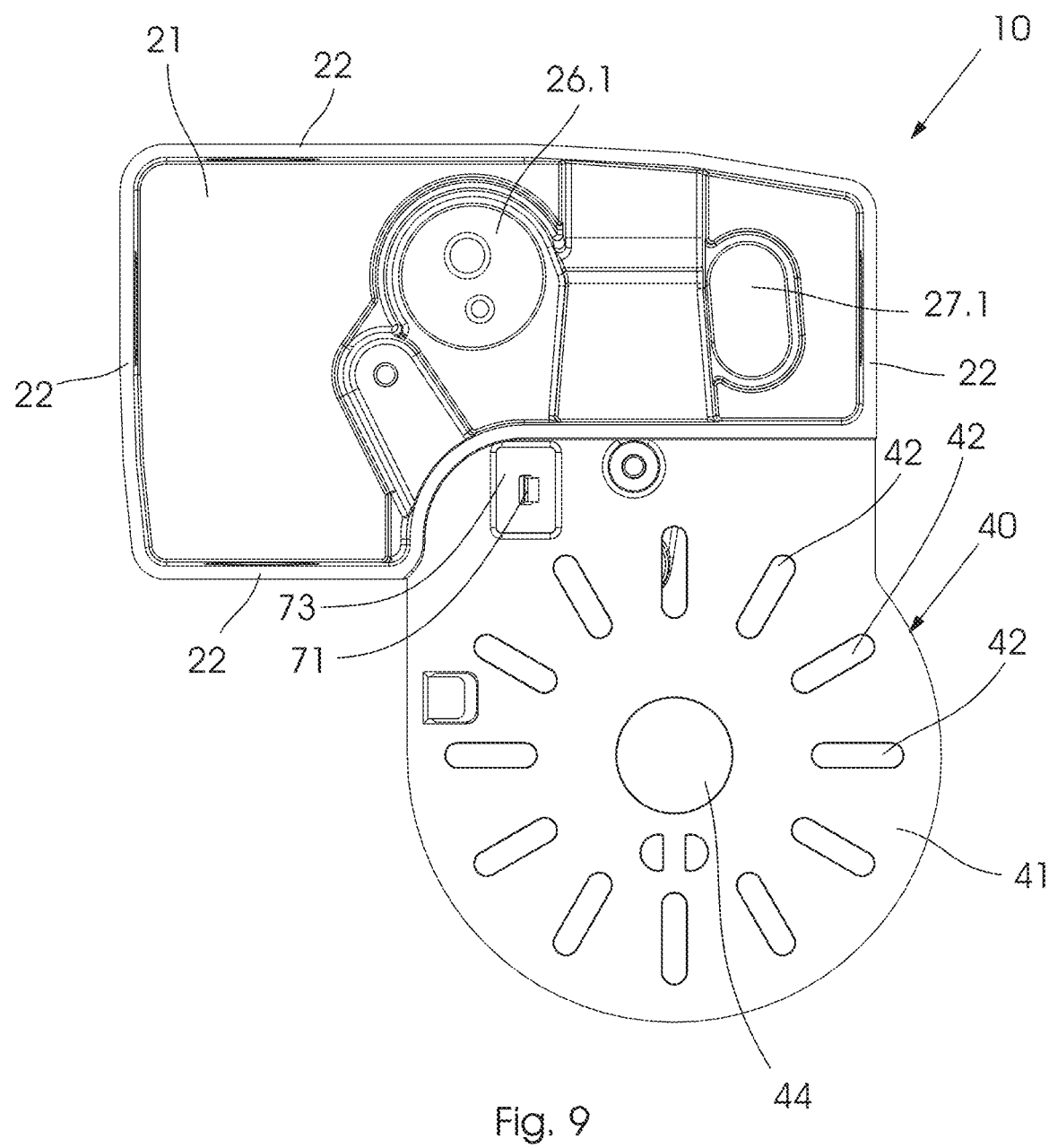
FIG. 9 shows a top view of the camera mount of FIG. 1 with its cover removed.

Returning to the illustrated embodiment, FIGS. 1 and 2 show top perspective views of the camera mount 10 in accordance with the invention. The camera mount 10 has a body 12 comprising an enclosure 20, a removable cover 30 and a camera support 40 on which a camera 100 (FIGS. 26 to 28) is, in use, mounted. The camera mount 10 is particularly useful for mounting a camera 100 a support surface (not shown) such as a wall or pole, for example. The camera mount 10 is connectable to the support surface by means of a mounting bracket 50 (FIG. 3). Although the term camera mount is used throughout the specification other terms, such as camera nest, may also be used to describe the invention. The term camera mount is simply intended to describe a structure for mounting a camera to a support surface. It is also envisaged that the camera mount could be integrally formed with the camera. For example, the camera mount could form part of the camera housing. The term camera mount should therefore be interpreted broadly to cover a mount separate from the camera or a mount forming part of the camera or camera housing.

In the embodiment illustrated in the accompanying drawings the camera mount 10 is separate from the camera in that the camera support 40 is in the form of a mounting platform on which the camera can be mounted. The body 12 is integrally formed as a single unit. In other words, the enclosure 20 and mounting platform 40 are integrally formed. It is envisaged that the enclosure 20 and mounting platform 40 could be moulded from a plastics material. However, the invention is not limited to the specific arrangement and in an alternative embodiment the enclosure 20 and mounting platform 40 could be manufactured as separate components which are connectable to one another.

Returning to the illustrated embodiment, the enclosure 20 has a base 21 and upstanding side walls 22 extending from the base. The internal volume of the enclosure 20 is closed off by the cover 30, which is removably connectable to the open end of the enclosure. Best seen in FIG. 13, the enclosure 20 and cover 30 have aligned securing formations 23, 31 in which a fastener 14 may be received for securing the cover to the enclosure. The securing formation 23 is formed as an upstanding ridge carrying a hole 24 in which the fastener 14, such as a screw, is received. The securing formation 31 in turn defines a recess in the cover 30 in which the fastener 14 is received. A cap 15 is received in the recess, in particular at its top end, to close off the recess. In use, when the fastener 14 secures the cover 30 to the enclosure 30 the fastener 14 extends into a retaining formation located on a removable grommet cover. More about this is said below.

Figure 13:
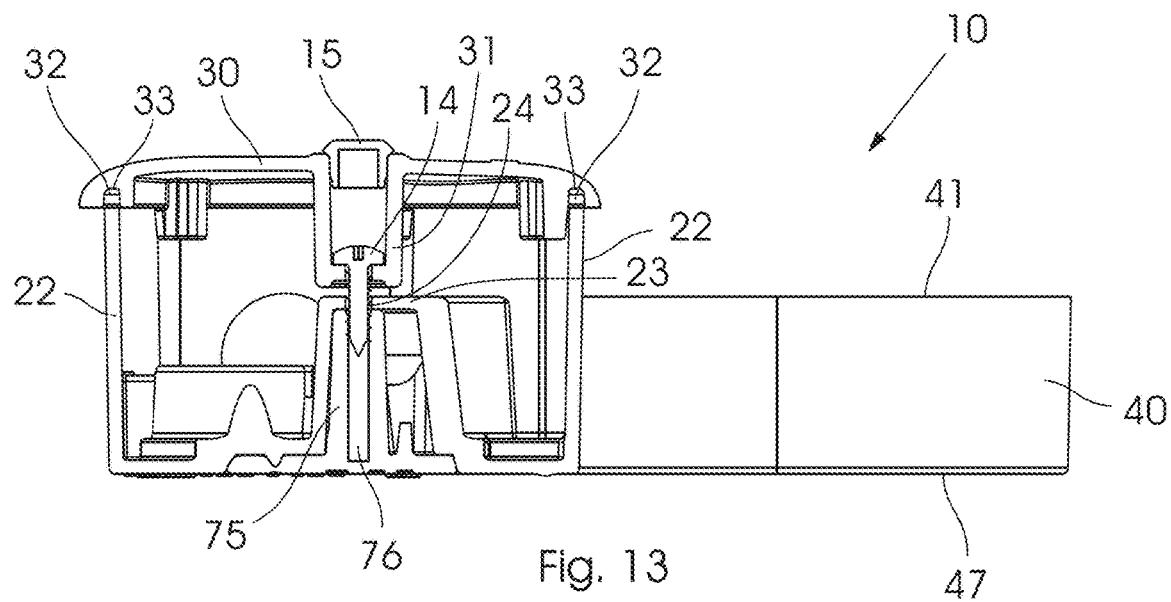
FIG. 13 shows a cross-sectional view of the camera mount of FIG. 1 taken along B-B as shown in FIG. 8.
Figure 14:
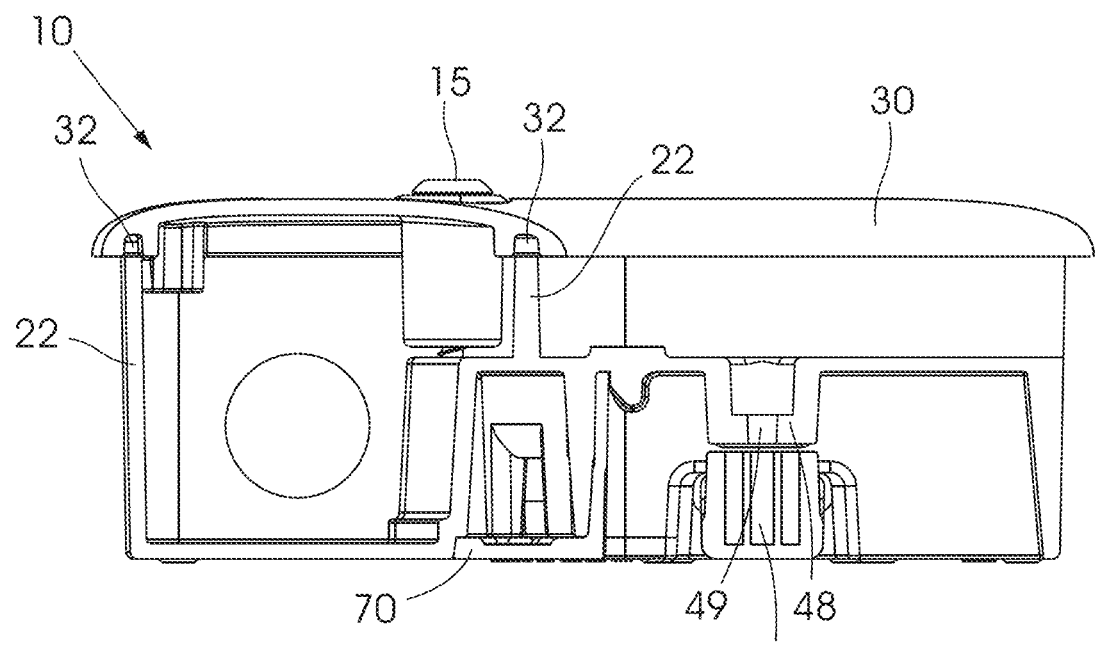
FIG. 14 shows a cross-sectional view of the camera mount of FIG. 1 taken along C-C as shown in FIG. 8.

Referring still to FIG. 13, it can be seen that the camera mount 10 has a sealing arrangement between the cover 30 and the enclosure 20. In this particular embodiment the sealing arrangement includes a continuous seal 32 that runs around the periphery of the cover 30. The seal 32 is received in a groove 33 located in the cover 30. The groove 33 and therefore the seal 32 are substantially aligned with the side walls 22 of the enclosure 20. Accordingly, when securing the cover 30 to the enclosure 20 the side walls 22 engage the seal 32 so as to create a sealed connection between the cover and enclosure, thereby providing ingress protection to the wire connections is located inside the enclosure.

Figure 11:
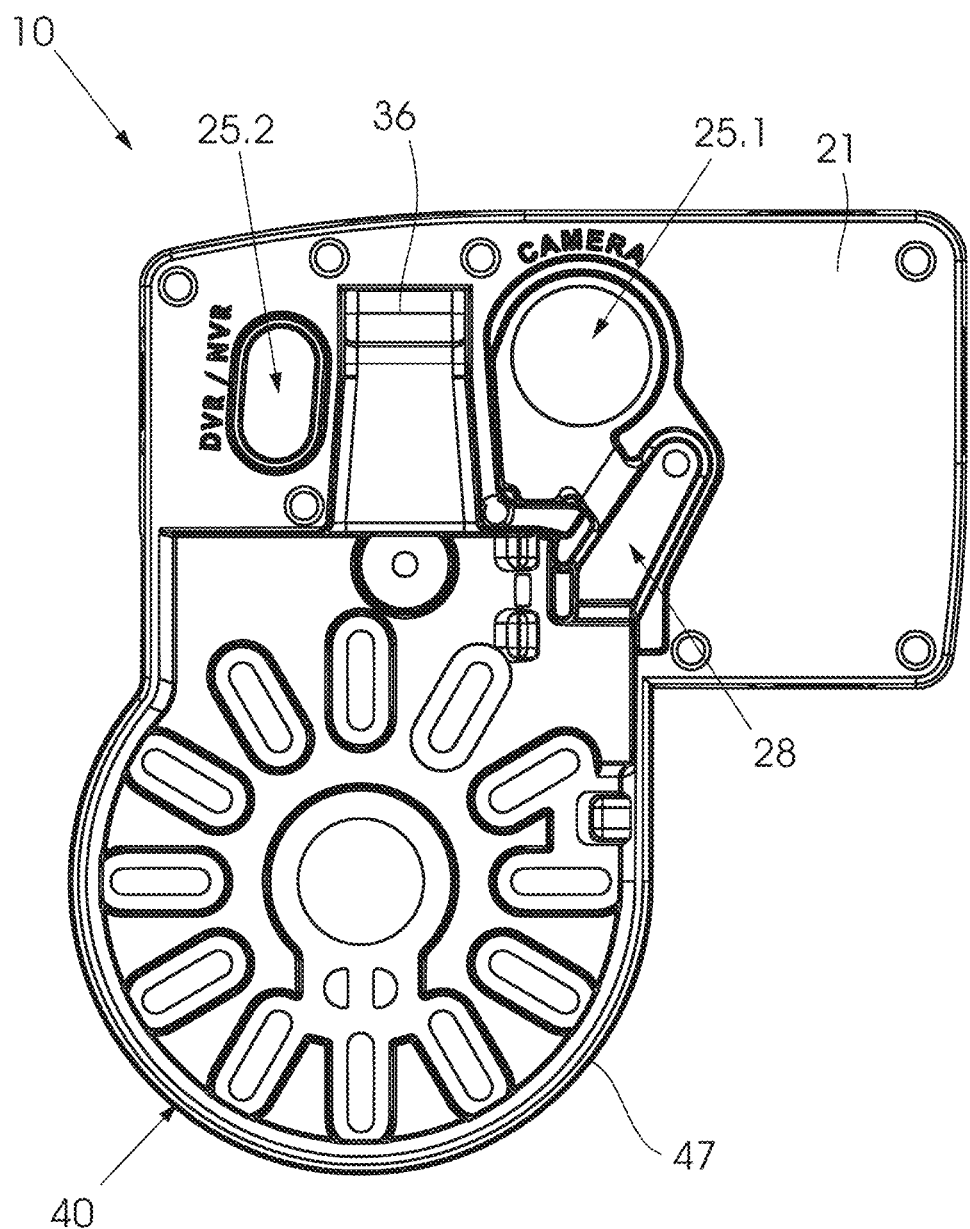
FIG. 11 shows a bottom view of the camera mount of FIG. 1 with its cover, mounting bracket, grommets and grommet cover removed.

From the above description of the enclosure 20 and cover 30 it should be understood that when the cover is secured to the enclosure the internal volume of the enclosure is substantially closed off to protect the wire connections between the camera and wires running from the surveillance system. At least one passage is located in the base 21 through which the wires running from the surveillance system are allowed to pass. In the illustrated embodiment a number of passages or openings are located in the base and allow peripheral items, such as wires for example, to pass through the base 21. Best seen in FIG. 11, first and second passages 25.1 and 25.2 extend through the base 21 to allow wires to enter into the internal volume of the enclosure 20. It is envisaged that the passages 25.1 and 25.2 could be used to accommodate wires of separate devices. For example, the passage 25.1 could accommodate camera wires while the passage 25.2 could accommodate the surveillance system wires, such as DVR or NVR wires. The second passage 25.2 allows the surveillance system wires to enter the enclosure 20 through the rear of the base 21. It is envisaged that this would be particularly useful in mounting situations where the wires would be coming out of a wall or other mounting surface and would need to enter the enclosure 20 from the rear surface. Alternatively, the surveillance system wires could enter the enclosure 20 through the side walls, particularly through the holes or cut-outs/knock-outs 34.

Figure 24:
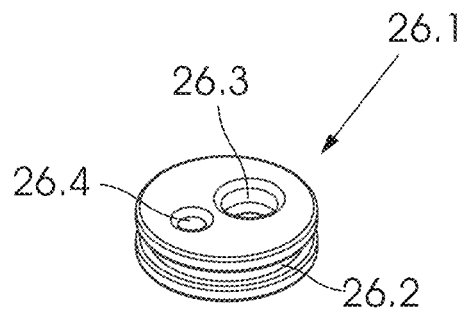
FIG. 24 shows a perspective view of a first closure of the camera mount of FIG. 1.
Figure 25:
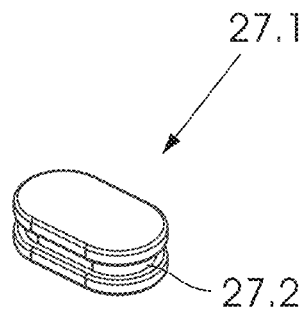
FIG. 25 shows a perspective view of a second closure of the camera mount of FIG. 1.

Each passage 25.1, 25.2 is preferably closable by means of a grommet, which is receivable in the passage in such a manner that it engages the base wall 21 in order to secure it inside the passage. FIGS. 24 and 25 show the closures 26.1 and 27.1 for closing the passages 25.1 and 25.2 respectively. The closures 26.1, 27.1 are in the form of grommets, which are preferably made from a resilient material such as rubber, for example. Referring now to FIG. 24, the grommet 26.1 is circular in shape and has an annular groove 26.2 for engaging the wall of the base 21. In use, the wall of the base 21 is received in and held captive in the groove 26.2 so as to secure the grommet in to the base 21. The grommet 26.1 further has openings 26.3 and 26.4 through which the wires running from the camera may pass. The openings 26.3 and 26.4 may each have a different shape and size to accommodate different wires. The grommet 27.1 for closing off the passage 25.2 is shown in FIG. 25 and has a stadium shape, i.e. rectangular with rounded ends. The grommet 27.1 again has a groove 27.2 in which the wall of the base 21 is received and held captive to secure the grommet to the base.

Figure 16:
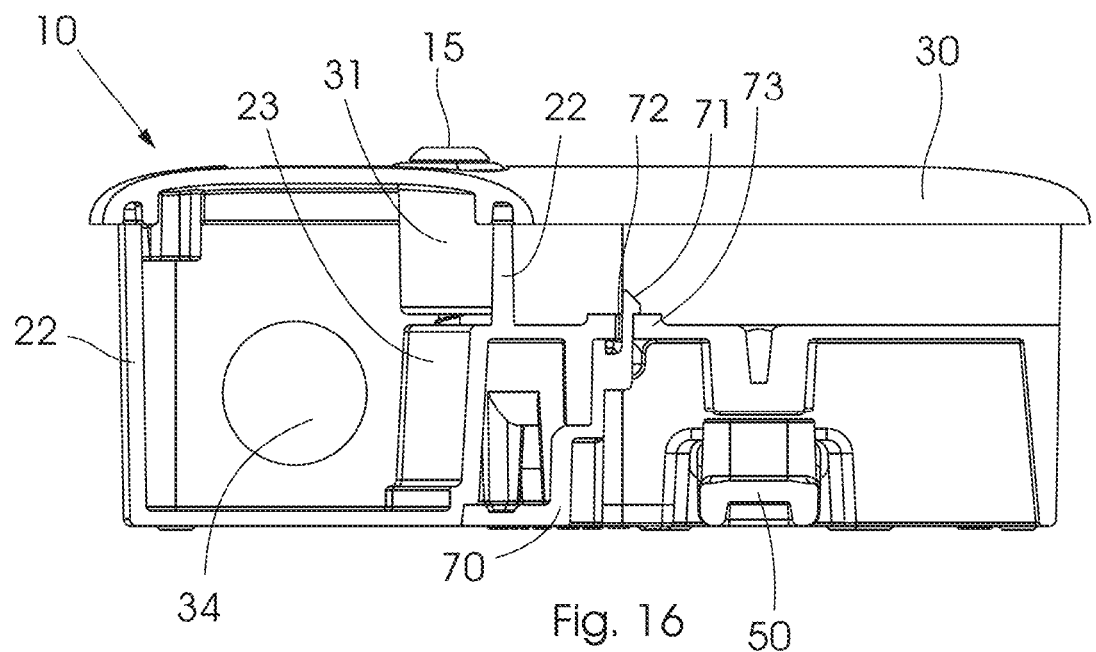
FIG. 16 shows a cross-sectional view of the camera mount of FIG. 1 taken along E-E as shown in FIG. 8.
Figure 17:
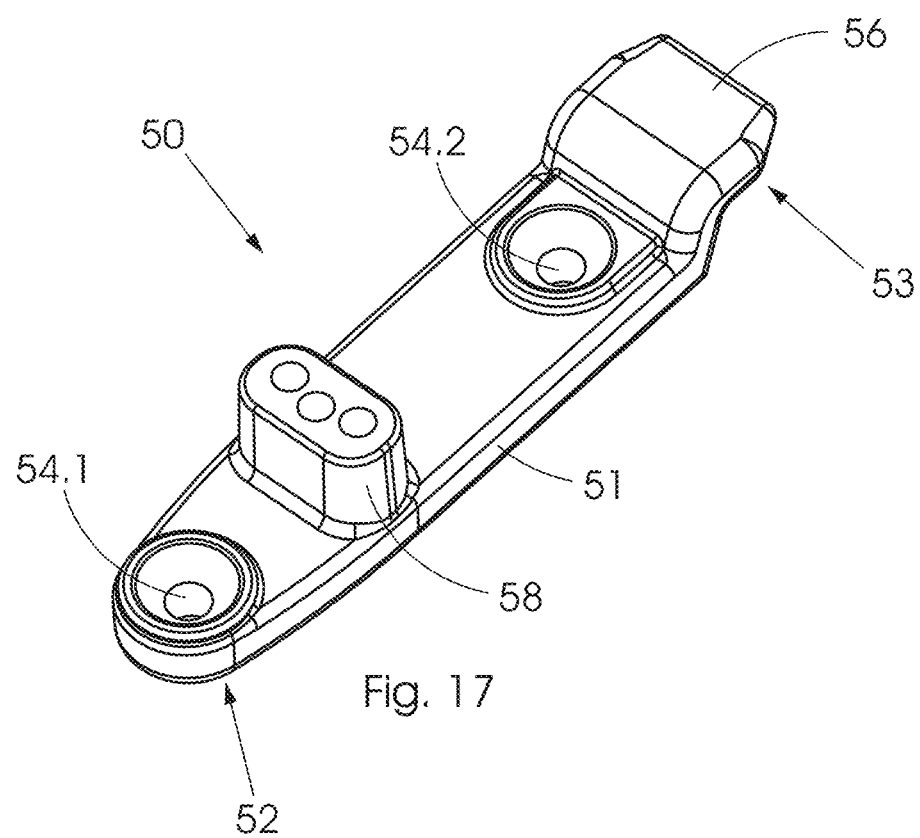
FIG. 17 shows a perspective view of a mounting bracket of the camera mount of FIG. 1.
Figure 18:
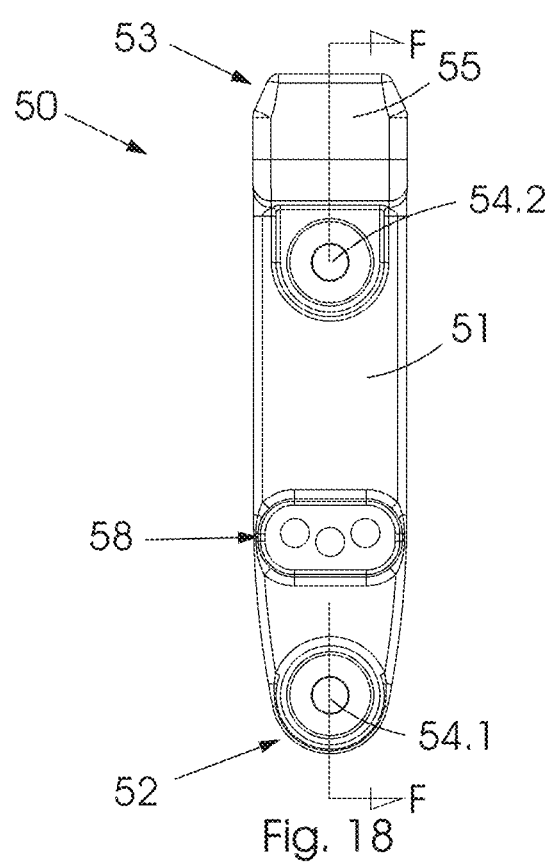
FIG. 18 shows a top view of the mounting bracket of FIG. 17.
Figure 19:
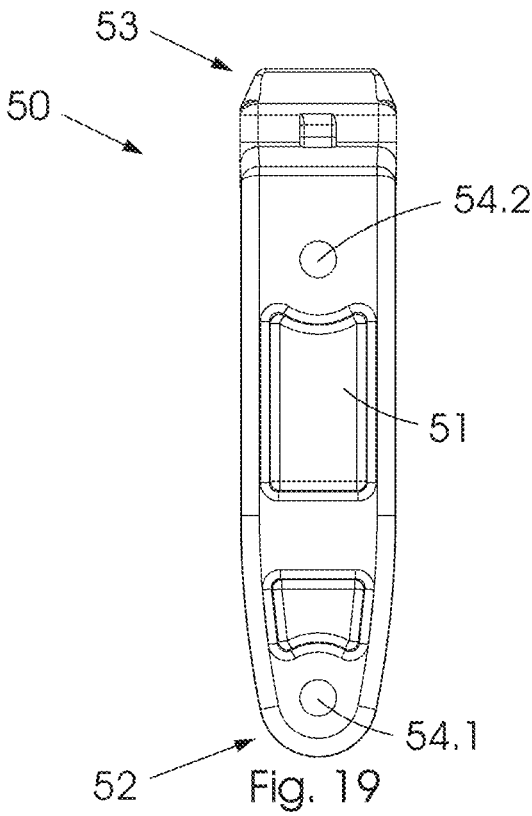
FIG. 19 shows a bottom view of the mounting bracket of FIG. 17.
Figure 22:
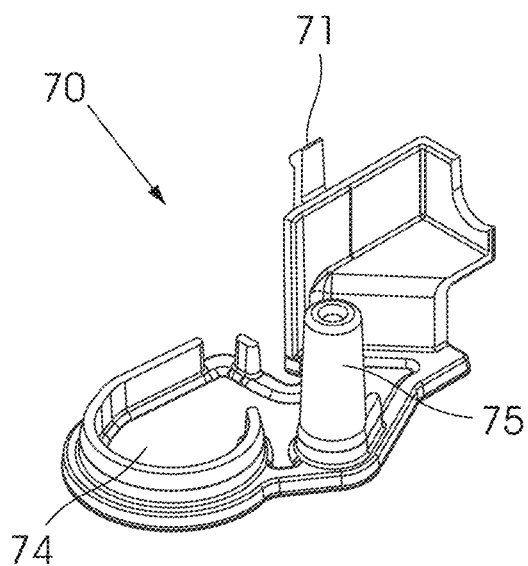
FIG. 22 shows a first top perspective view of a grommet cover of the camera mount of FIG. 1.
Figure 23:
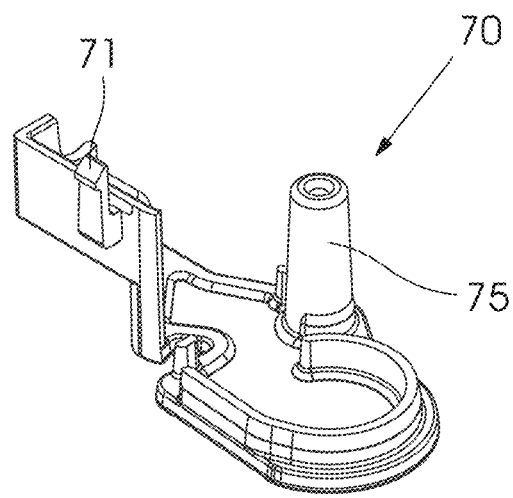
FIG. 23 shows a second top perspective view of a grommet cover of FIG. 22.

The grommet 26.1 is, in use, protected by a grommet cover 70, which is shown in detail in FIGS. 22 and 23. The grommet cover 70 carries attachment means 71 for attachment to the body 12 and in particular to the platform 40. The attachment means 71 is in the form of a resilient or biased clip which engages the platform 40. Best seen in FIG. 16, the clip 71 passes through an opening 72 in the platform 40 and engages a portion of the platform in order to secure the grommet cover 70 to the platform. The platform 40 is reinforced around the opening 72 so as to define an attachment formation 73 that is engaged by the clip 71. In the illustrated embodiment the attachment formation 73 is in the form of a thickened area of the platform 40. It should be understood that, in use, the grommet cover 70 is placed over the recess in the base 21 so that the clip 71 protrudes through the opening 72 so as to clip onto the platform 40 in order to secure it in position. The grommet 26.1 and grommet cover 70 provide ingress protection for the camera wires and, in particular, the grommet cover 70 acts as a protective barrier covering the camera wire grommet 26.1.

Returning now to FIGS. 22 and 23, the grommet cover 70 has a grommet raining wall or ridge 74 which is shaped complementary to the grommet 26.1.

Figure 15:
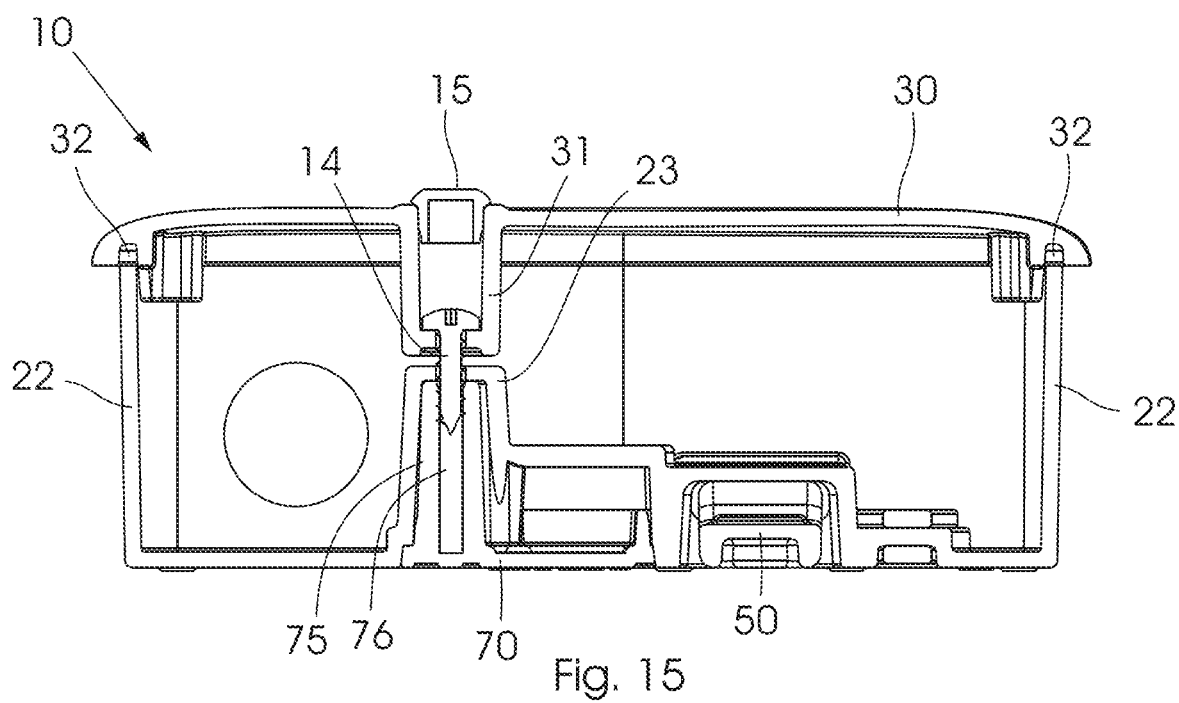
FIG. 15 shows a cross-sectional view of the camera mount of FIG. 1 taken along D-D as shown in FIG. 8.

As mentioned above, when the fastener 14 extends into a retaining formation located on the grommet cover 70. The retaining formation is indicated by the numeral 75 and is best seen in FIGS. 22 and 23. The retaining formation is conical in shape and has a side wall defining an internal opening 76 in the form of a blind hole in which the fastener 14 is received. The blind hole 76 is dimension such that the fastener cuts into the side wall in order to grip and, therefore, secure the grommet cover 70. As shown in FIG. 15, the fastener 14 secures the cover 30, enclosure 20 and grommet cover 70 together.

The camera wires passing through the openings 26.3 and 26.4 run from the camera mounted on the mounting platform 40. The mounting platform 40 has an external, mounting surface 41 on which the camera 100 is typically mounted. The mounting platform 40 has means for mounting the camera 100 to the mounting surface 41. In the illustrated embodiment the means for mounting the camera includes a number of formations 42 which allow for different mounting configurations. The formations 42 are in the form of openings, typically slots, which extend through the base wall 43 of the mounting platform. In use, fasteners (not shown) extend through the slots 42 in the base wall 43 in order to secure the camera 100 to the mounting platform 40.

It should be understood that the radially spaced apart slots 42 allow for cameras that have different mounting configurations to be mounted to the camera mount 10. The camera mount can therefore be said to be a universal mount that is compatible with different camera mounting configurations.

Figure 10:
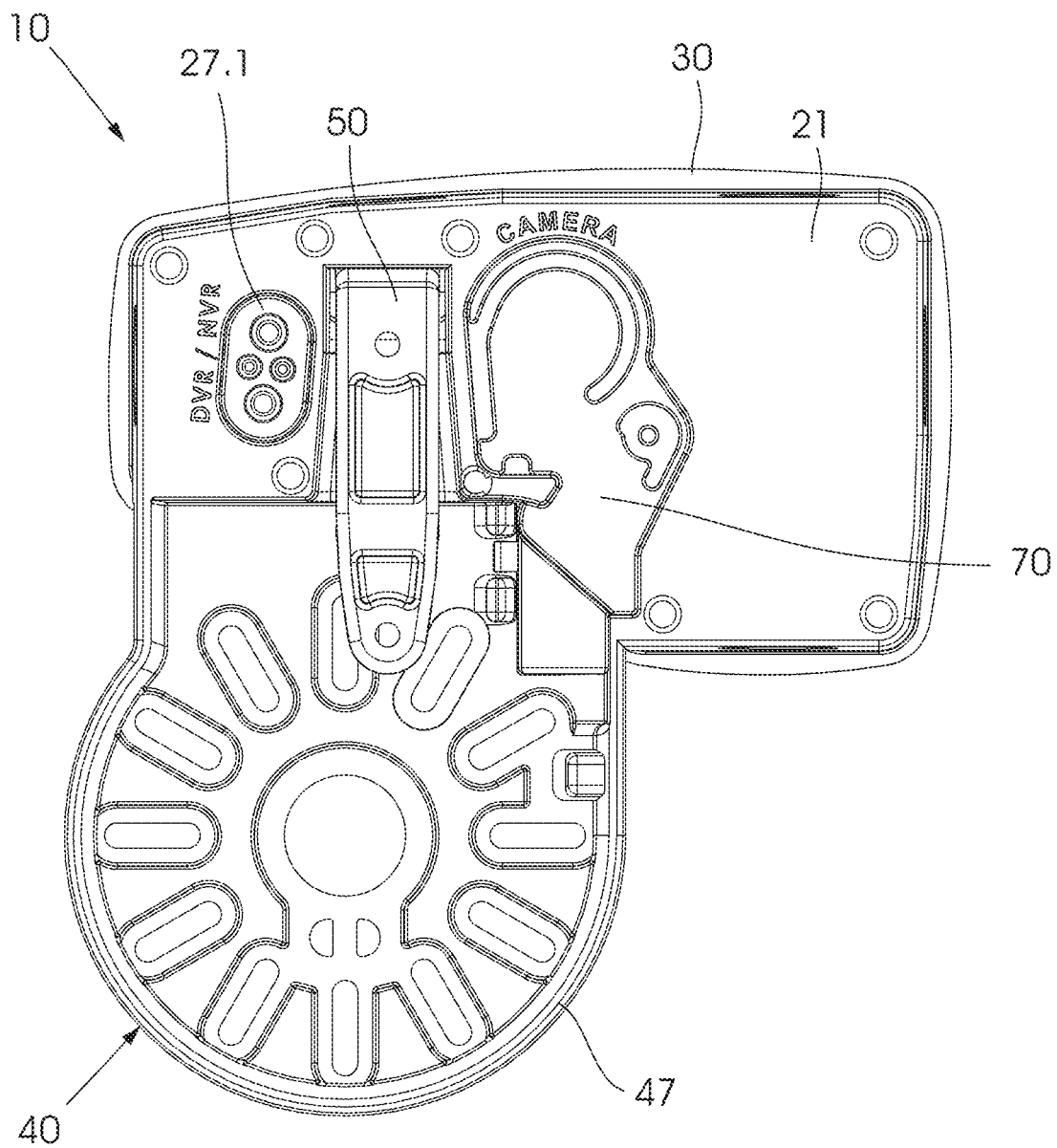
FIG. 10 shows a bottom view of the camera mount of FIG. 1.

The mounting platform 40 further has a recess 44 extending through its base wall 43 through which the camera wires run when, in use, the camera 100 is mounted to the camera mount 10. For this reason the recess 44 is located in the centre of the mounting surface 41. Probably best seen in FIG. 3 the camera wires in use extend through the recess 44, into an internal volume 45 defined by the mounting platform 40, through the passage 25.1 and into the internal volume of the enclosure 20 where they are connected to the wires of the surveillance system. The camera wires run inside a channel 28 located in the base 21 of the enclosure 20 prior to entering the passage 25.1. The channel 28 not only protects the wires but also allows the enclosure 20 to be mounted flush with the support surface against which the enclosure is, in use, mounted. In comparing FIGS. 10 and 11 it can be seen that the grommet cover 70 also closes off the channel 28 to provide ingress protection for the camera wires.

Referring still to FIG. 3, it can be see that that the mounting platform 40 includes a side wall 46 defining a protective skirt. The side wall 46 protrudes from the base wall 43 such that the skirt runs around substantially the entire periphery of the mounting platform 40. The base wall 43 together with the side wall 46, and accordingly the skirt, close off the internal volume 45 of the mounting platform in order to protect the camera wires and connections. The skirt is therefore a protective skirt that provides ingress protection to the camera wires and connections. The skirt also prevents unwanted access to the camera wires and connections.

The end 47 of the skirt, i.e. the end of the side wall 46, is shaped for complemental engagement with the support surface against which the enclosure is, in use, mounted. The camera mount 10 as shown in the accompanying drawings is intended for mounting against a flat surface such as a wall. Accordingly, the end 47 of the skirt 46 terminates in a planner surface substantially in line with the exterior surface of the base 21 of the enclosure 20. It is however envisaged that in an alternative embodiment the skirt 46 and/or the base 21 could be contoured to fit a different profile support surface.

Best seen in FIG. 3, the base wall 43 is reinforced, particularly around the slots 42 and recess 44 so as to improve the structural integrity of the mounting platform 40.

The camera mount 10 further includes a mounting bracket 50 for connecting the body 12, i.e. the enclosure 20 and mounting platform 40, to the support surface. The mounting bracket 50 is shown in detail in FIGS. 17 to 21. The mounting bracket 50 has an elongate body 51 extending between a first end, which is typically in use a lower end 52, and a second end, which is typically in use a top end 53.

The body 51 carries holes 54.1 and 54.2 for securing the mounting bracket 52 the support surface. In use, fasteners such as anchor screws or bolts 104 (FIG. 28) extend through the holes 54.1 and 54.2 in order to secure the mounting bracket to the support surface. As shown in the cross-sectional view of FIG. 17, the holes 54.1 and 54.2 are countersunk to receive the heads of them anchor screws or bolts.

Figure 12:
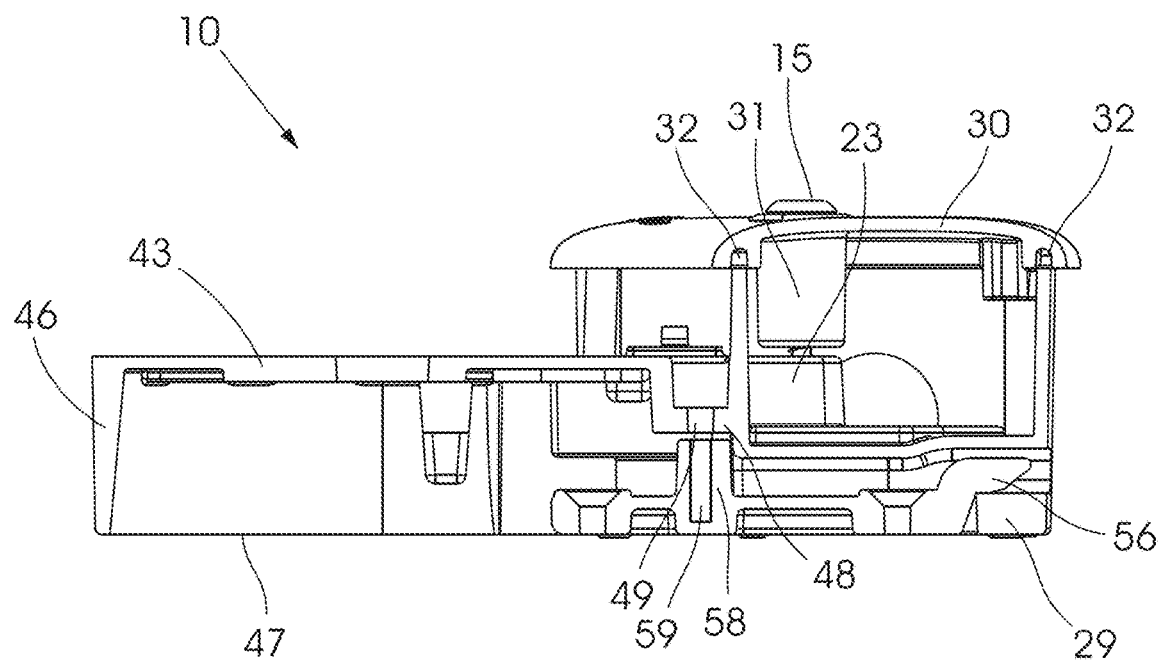
FIG. 12 shows a cross-sectional view of the camera mount of FIG. 1 taken along A-A as shown in FIG. 8.
Figure 20:
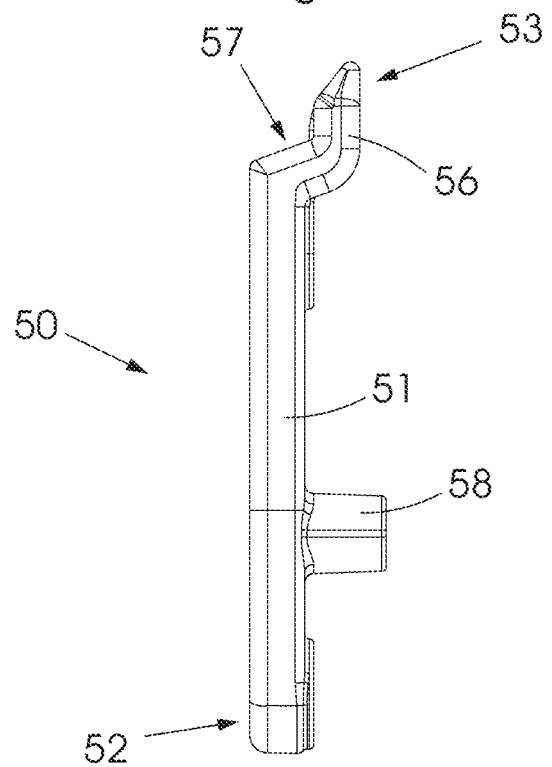
FIG. 20 shows a side view of the mounting bracket of FIG. 17.
Figure 21:
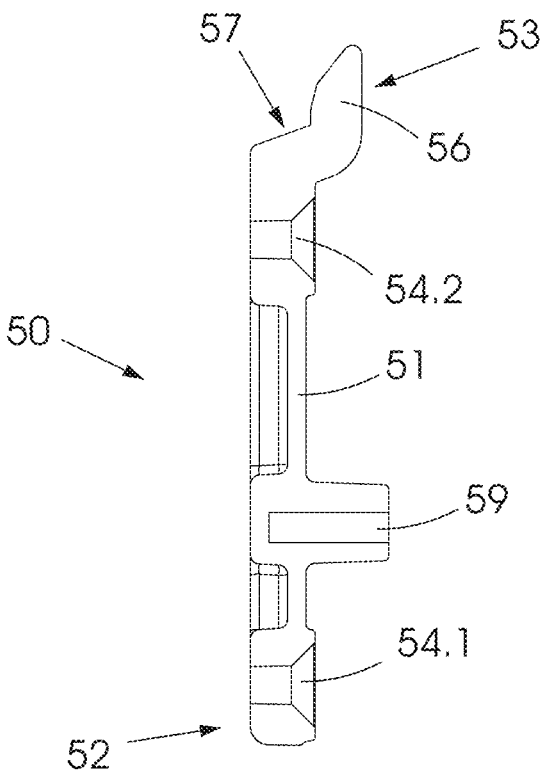
FIG. 21 shows a cross-sectional view of the mounting bracket of FIG. 17 taken along F-F as shown in FIG. 18.

At the end 53 the mounting bracket 50 carries an engagement formation 55 for engaging the enclosure 20, particularly a complimentary shaped engagement formation 29 carried by the enclosure. Referring to FIGS. 20 and 21, it can be seen that the engagement formation 55 on the mounting bracket is in the form of an upstanding hook 56 so as to define a space 57 between it and the support surface against which the camera 100 is, in use, mounted. Best seen in FIG. 12, the engagement formation 29 located on the enclosure 20 is received in the space 57 between the hook formation 56 and support surface. When the mounting bracket 50 is mounted vertically against a wall, for example, the hook formation 56 is shaped such that it is open to the top, i.e. its mouth faces upwards, in order to receive the engagement formation 29 located on the enclosure 20 from the top. It should be understood that this facilitates easy mounting of the body 12 of the camera mount 10 to the mounting bracket 50. For example, once the mounting bracket 50 is fixed in place against the wall, the body 12, and in particular the enclosure 20, can easily be suspended from the mounting bracket by hooking the enclosure onto the hook formation 56. With the enclosure suspended from the mounting bracket 50 it can be fixed in place by inserted a securing fastener (not shown) into aligned securing formations located on the body 12 and mounting bracket 50 respectively. The securing formation 58 located on the mounting bracket is shaped to receive the fastener in a blind hole 59. The securing formation 48 located on the body 12 is in turn in the form of a recess formed in the base wall 43 of the mounting platform 40. As shown in FIG. 12, a threaded fastener is typically inserted into the recess 48 such that it extends through an opening 49 and is then threaded into the blind hole 59. The hole 59 is dimensioned to allow the thread of the fastener to cut into the side wall of the securing formation 58, thereby securing the body 12 to the mounting bracket 50.

In order to allow the enclosure 20 to be mounted flush against the support surface the bracket 50 is recessed into the enclosure (probably best seen in FIG. 3). The enclosure 20 carries a recess 36 in which the bracket 50 is received. The bracket 50 is shown inside the recess 36 in FIG. 10 and removed from the recess in FIG. 11.

Figure 26:
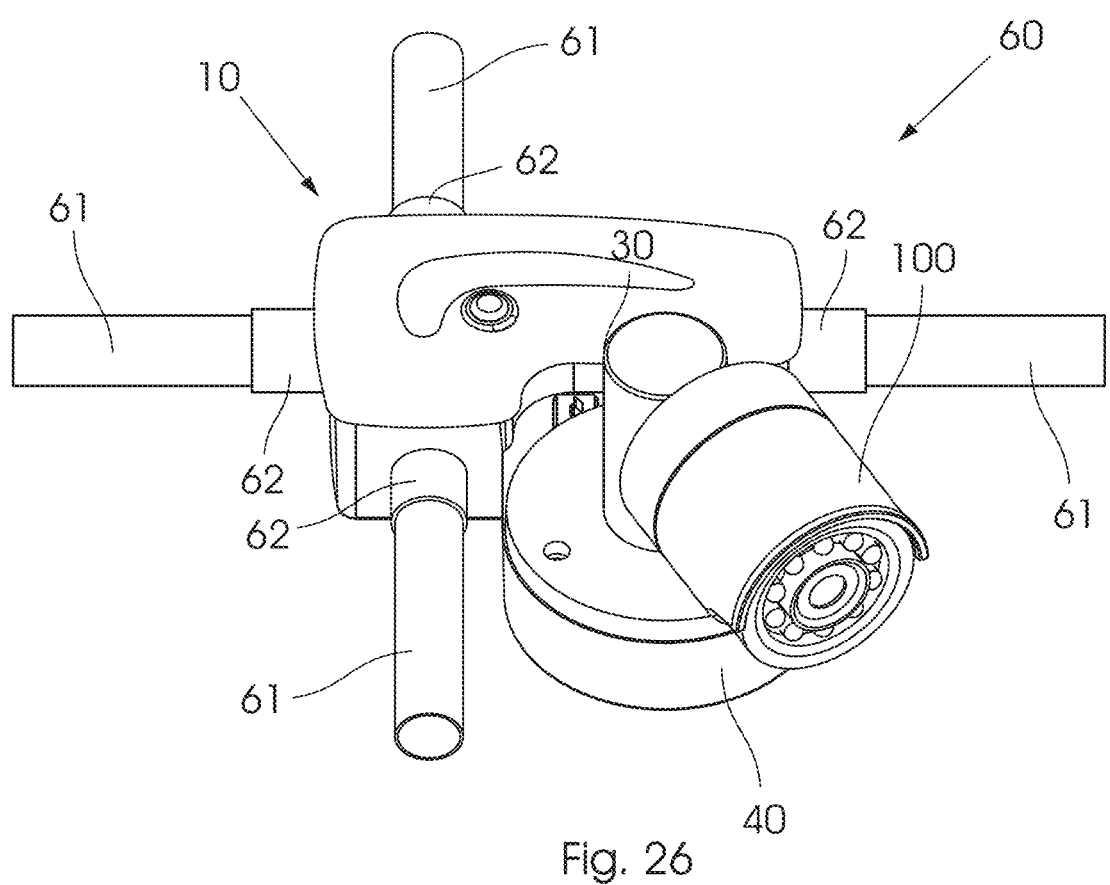
FIG. 26 shows a first top perspective view of a camera installation including a camera mount of FIG. 1.
Figure 27:
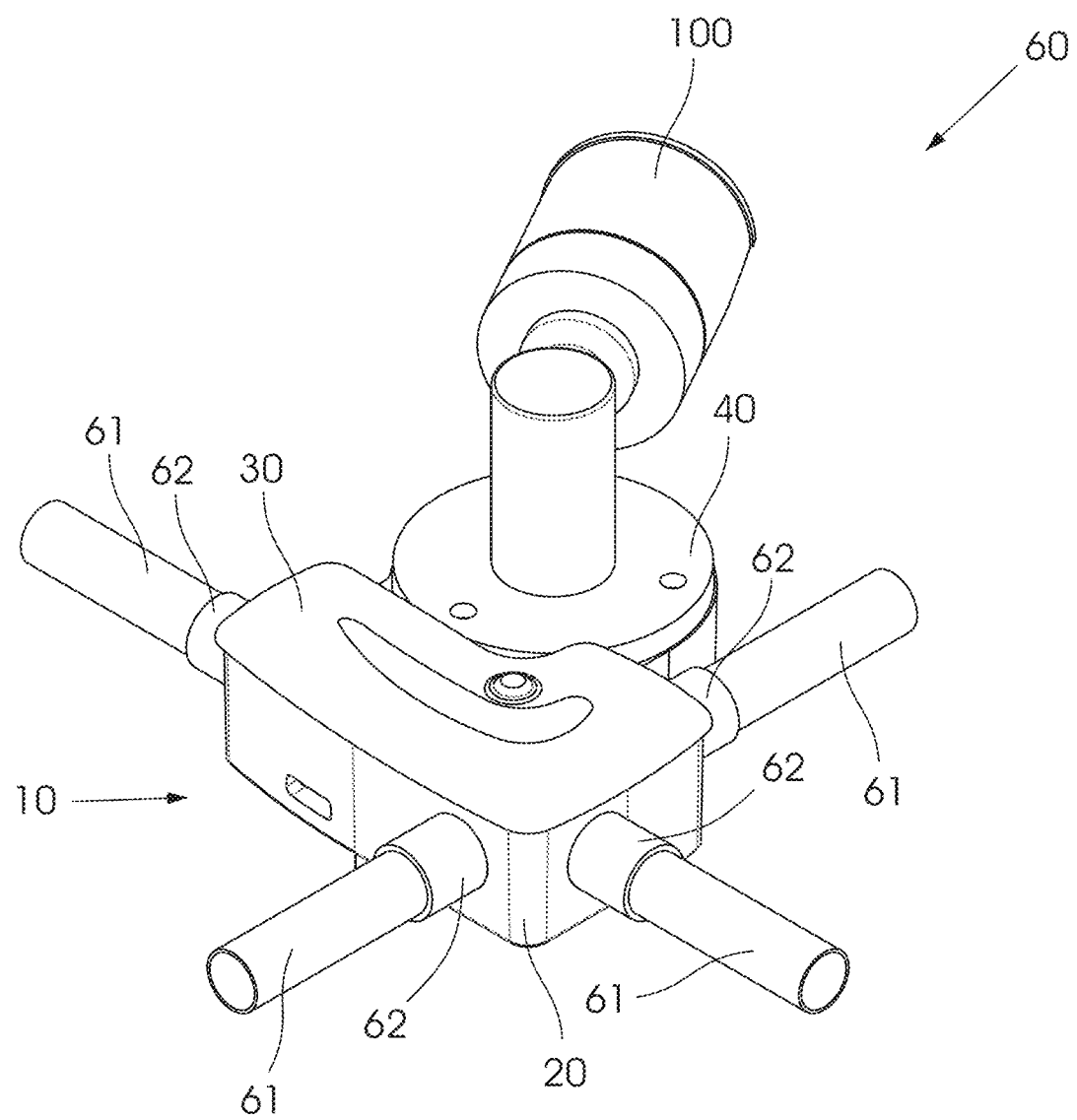
FIG. 27 shows a second top perspective view of a camera installation including a camera mount of FIG. 1.
Figure 28:
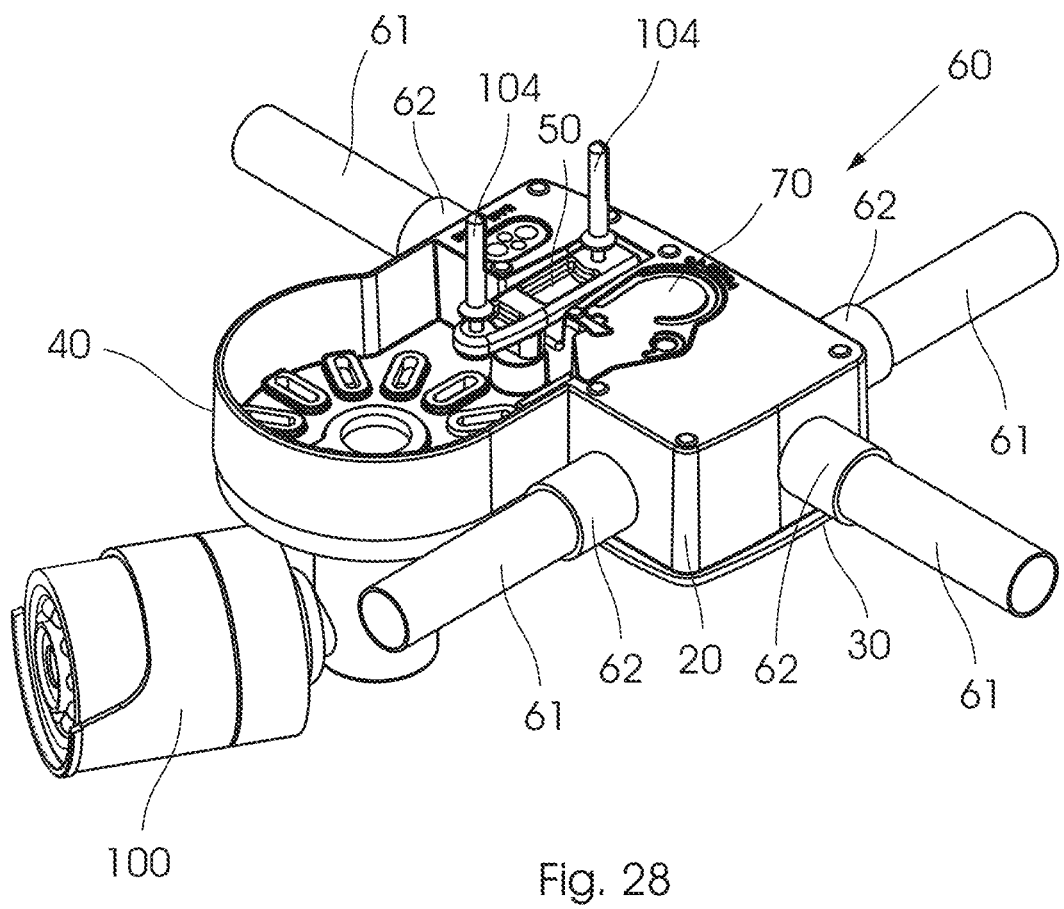
FIG. 28 shows a bottom perspective view of a camera installation including a camera mount of FIG. 1.

Referring now in particular to FIGS. 26 to 28 an installation 60 including the camera mount 10 will be described. In the installation 60 the camera 100 can be seen mounted on the mounting platform 40. In this illustrated embodiment a number of conduits 61 are shown connected to the enclosure 20 of the camera mount 10 using connectors 62. In use, the connectors 62 are connected to holes 34 located in the side walls 22. It is envisaged that the holes 34 could be created by removing knockout sections in the side walls 22 or be removing closures 65 (FIGS. 2 and 3). Although some holes 34 are not shown to be closed off by closures 65 it is envisaged that all holes 34 in the side wall 22 could be closed off by the removable closures 65. In use, the knockout sections or closures 65 are removed to create holes for receiving the connectors 62 as required by a particular installation. It should however be noted that the side walls could be solid without openings of knock-out areas.

Although the method of installing a camera 100 using the camera mount 10 of the invention should be clear form the above description it will now be described briefly for the sake of clarity. The method generally commences by securing the mounting bracket 50 to the support surface using the anchor screws or bolts 104 (FIG. 28). In a separate step, the camera 100 is fastened to the mounting platform 40. The camera's wires are drawn into the internal volume of the enclosure 30, thereby passing through a sealing assembly, which is the grommet 26.1 and grommet cover 70 in the illustrated embodiment. The sealing assembly provides ingress protection to the internal volume of the enclosure 40. After drawing the camera wires through the grommet 26.1 the grommet cover 70 may be connected to the body 12. This is done by clipping the clip 71 on to the attachment formation 73. Once the clip 71 is clipped on to the mounting cover 40 the grommet cover 70 is held in position, thereby retaining the grommet 26.1 in position. Next, the body 12 of the camera mount 10 is mounted to the hook formation 56 of the complementary shaped engaging formation 55 of the mounting bracket 50 such that the body 12 is suspended from the mounting bracket 50. The body 12 is secured to the mounting bracket 50 by inserting the fastener into the aligned securing formations 48, 58. Now that the camera 100 is mounted in position and safe from dropping, the installer's hands are free to connect the camera wires to the wires from the surveillance system. The wire connections are located inside the internal volume of the enclosure which is closed off by connecting the cover 30 to the enclosure 20, thereby providing ingress protection to the wire connections.

An advantage of the camera mounting arrangement 10 according to the invention is that the camera 100 is mounted securely to the support surface while the installer connects the camera wires to the wires of the surveillance system. The camera mounting arrangement 10 further allows the installer access to the wire connections to use a camera tester while the camera is mounted in position. These advantages are achievable because of the off-set between the mounting platform 40 on which the camera 10 is mounted and the enclosure 20. This is in contrast to the known standard enclosure mounting methods in which the camera is carried by the cover mounted on the enclosure. By providing a camera mounting position that is removed from the cover 30 the steps of mounting the camera and testing and/or adjusting the camera are separated to allow for safe and easy installation of the camera. It should further be understood that the this is also made possible by the two-stage mounting procedure, i.e. by mounting the camera to the mounting platform 40 in the first stage and thereafter mounting the body 12 to the bracket 50 located on the support surface in a separate, second stage. This simplified mounting procedure allows for safe installation when working at height, which is a significant advantage over the known methods of mounting cameras. Furthermore, the invention may allow for installation and positioning of cameras and their associated field of view and installation of surveillance systems and associated cabling to be carried out separately and independent of each other. This may be advantageous as the cameras could be mounted and their field of views positioned accurately while the surveillance system could be installed at a later stage or vice versa.

A further advantage of using the camera mounting arrangement 10 of the invention is that it provides ingress protection for the wires and wire connections while at the same time preventing unwanted access to thereto.

The abovementioned advantages are achieved in both the embodiments in which the camera mounting arrangement 10 and camera are integrally formed and in which the camera mounting arrangement 10 and camera are separate components. In both configurations the camera support carrying the camera is off-set from the enclosure housing the connections. The characteristic of the camera and the enclosure through which the camera connections are accessible being off-set to one another is present in both of these configurations, irrespective of whether the camera is a separate component to the camera mount. From the above description of the invention it should be clear that the characteristic of being off-set represents the ability to access the enclosure, and accordingly the camera connections housed therein, while the camera is carried by the camera support. It should therefore be understood that the word "off-set" should be interpreted to mean that the camera is not carried by the enclosure cover in a manner that the camera has to be moved or removed in order to access the camera connections. The word "off-set" should therefore be interpreted to mean off-set in any direction and/or in any one or more dimensions and is not limited to being off-set in a single plane, e.g. in two dimensions, only. For example, in the embodiment shown in the drawings the camera is off-set from the enclosure with the enclosure above the camera, however in another embodiment the enclosure could be underneath the camera.

It will be appreciated that the above description only provides some embodiments of the invention and that there may be many variations without departing from the spirit and/or the scope of the invention. It is easily understood from the present application that the particular features of the present invention, as generally described and illustrated in the figures, can be arranged and designed according to a wide variety of different configurations. In this way, the description of the present invention and the related figures are not provided to limit the scope of the invention but simply represent selected embodiments.

The skilled person will understand that the technical characteristics of a given embodiment can in fact be combined with characteristics of another embodiment, unless otherwise expressed or it is evident that these characteristics are incompatible. Also, the technical characteristics described in a given embodiment can be isolated from the other characteristics of this embodiment unless otherwise expressed.

What is claimed is:

1. A universal camera mounting arrangement for mounting a camera, comprising:

an enclosure for housing electrical connections between the camera and a surveillance system;
a cover which is removably connectable to the enclosure to close off the enclosure when connected to the enclosure; and
a camera support for supporting the camera,
wherein the enclosure and camera support are integrally formed and off-set from one another such that the cover may be removed to allow access to the enclosure while the camera is supported by the camera support, and
wherein the camera support is a mounting platform comprising a base wall to which the camera is removably connectable, wherein the base wall comprises a central recess and a plurality of openings for the camera to be mounted on the mounting platform, and wherein the openings are arranged circumferentially around the central recess to allow different cameras with different mounting configurations to be mounted to the mounting platform.

2. The universal camera mounting arrangement according to claim 1, wherein the camera support extends from the enclosure.

3. The universal camera mounting arrangement according to claim 1, wherein the camera support includes a side wall defining a protective skirt that provides ingress protection to the camera wires.

4. The universal camera mounting arrangement according to claim 3, wherein the skirt runs around substantially the entire periphery of the camera support and is shaped to engage the support surface against which the camera is in use mounted.

5. The universal camera mounting arrangement according to claim 4, including a channel extending between the camera support and the enclosure along which the camera wires in use run, wherein the channel provides protection for the wires.

6. The universal camera mounting arrangement according to claim 5, wherein the enclosure has a base and side walls extending from the base, wherein the base define a passage through which wires run in use.

7. The universal camera mounting arrangement according to claim 6, wherein the passage is open to the channel in which the camera wires run.

8. The universal camera mounting arrangement according to claim 7, wherein the passage is integrally formed with the channel in which the camera wires run.

9. The universal camera mounting arrangement according to claim 6, including a closure which is receivable in the passage in the enclosure thereby to provide ingress protection to the wire connections located in the enclosure.

10. The universal camera mounting arrangement according to claim 9, wherein the closure is in the form of a grommet.

11. The universal camera mounting arrangement according to claim 10, wherein the grommet is made from a resilient material such that it is capable of stretching over a wide variety of camera connection features of different shapes and sizes.

12. The universal camera mounting arrangement according to claim 11, including a grommet cover for protecting the grommet.

13. The universal camera mounting arrangement according to claim 6, wherein the side walls of the enclosure carry openings for receiving conduits.

14. The universal camera mounting arrangement according to claim 6, wherein the enclosure carries a plurality of areas of weakness that define knock-out holes to create openings for receiving conduits.

15. The universal camera mounting arrangement according to claim 1, including a mounting bracket for connecting the enclosure to the support surface.

16. The universal camera mounting arrangement according to claim 15, wherein the mounting bracket carries an engagement formation for engaging a complementary shaped engagement formation located on the enclosure.

17. The universal camera mounting arrangement according to claim 16, wherein the engagement formation on the mounting bracket is in the form of an upstanding hook so as to define a space between it and the support surface against which the camera is, in use, mounted, and wherein the engagement formation located on the enclosure is received in the space between the hook formation and support surface.

18. The universal camera mounting arrangement according to claim 17, wherein the hook formation is shaped such that, in use, it is open to the top, i.e. faces upwards, thereby to receive the engagement formation located on the enclosure from the top.

19. The universal camera mounting arrangement according to claim 1, wherein the mounting bracket and enclosure define aligned securing formations in which a fastener may be received for securing the enclosure to the mounting bracket.

20. The universal camera mounting arrangement according to claim 1, wherein the cover and enclosure define aligned securing formations in which a fastener may be received for securing the cover to the enclosure.

21. The universal camera mounting arrangement according to claim 1, wherein a sealing arrangement is located between the cover and the enclosure for ingress protection.

22. The universal camera mounting arrangement according to claim 21, wherein a seal runs substantially around the periphery of the cover.

23. The universal camera mounting arrangement according to claim 1, further comprising a fastener extending through at least some of the plurality of openings to secure the camera to the camera support.

24. The universal camera mounting arrangement according to claim 23, wherein the plurality of openings is arranged at substantially equal distances from each other.

25. The universal camera mounting arrangement according to claim 1, wherein each of the plurality of openings is in a slot shape such that the mounting arrangement is compatible with a variety of cameras having said different mounting configurations.

\* \* \* \* \*